Dec. 11, 1951  E. D. L. BOWMAN  2,578,284
WARNING SIGNAL SYSTEM
Filed Dec. 7, 1949

INVENTOR
ERVIN D. L. BOWMAN
BY
Bates, Teare & McBean
ATTORNEYS

Patented Dec. 11, 1951

2,578,284

UNITED STATES PATENT OFFICE 2,578,284

WARNING SIGNAL SYSTEM

Ervin D. L. Bowman, Fairview Park, Ohio

Application December 7, 1949, Serial No. 131,621

4 Claims. (Cl. 200—167)

This invention relates to an improved warning or danger signal system for automotive vehicles or the like. The invention is particularly adapted for use by automotive highway trucks and includes the use of an improved flasher mechanism for automatically flashing lamps on and off. These, therefore, are the general objects of the present invention.

The invention contemplates the provision of an improved warning system for automotive vehicles whereby certain lamps of an automotive vehicle may be conditioned, at the will of the operator, for either continuous or flasher operation. The invention also is concerned with the provision of an improved warning system having a flasher mechanism which may be removed without the use of tools, and wherein the lamps controlled by the flasher may be conditioned for continuous operation regardless of whether the flasher mechanism is in position or has been removed. Further, according to the invention the improved flasher unit is provided with a visible indicator which, when the unit is in place in the system, will indicate to the operator whether the circuit is conditioned for continuous or flasher operation.

Other objects and advantages of the present invention will become more apparent from the following description which refers to a preferred embodiment of the invention illustrated in the accompanying drawings. The essential and novel features of the invention will be summarized in the claims.

Figure 1:
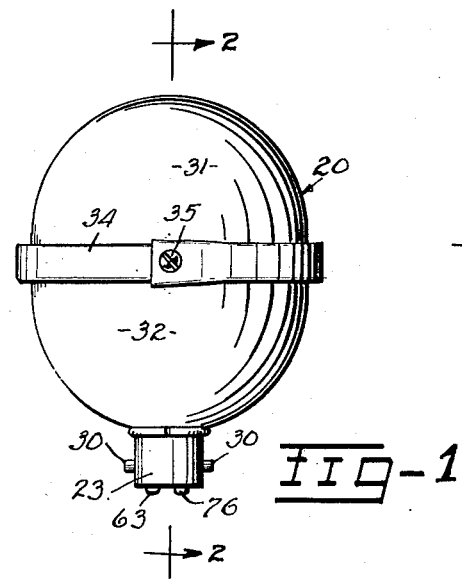
Figure 2:
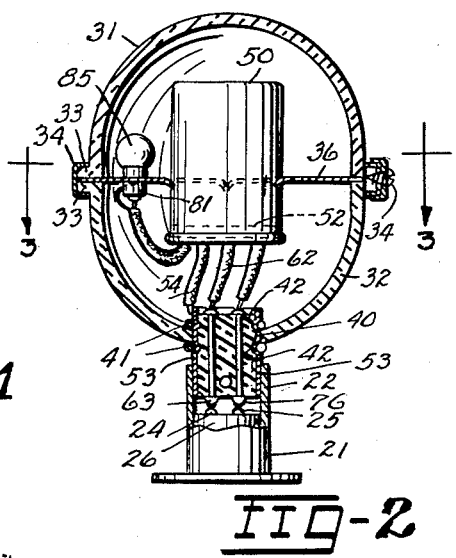
Figure 3:
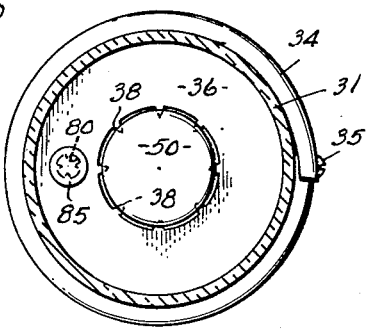

In the drawings, Fig. 1 is an elevational view of the improved flasher unit; Fig. 2 is a sectional view of the improved flasher unit removably mounted in a suitable receptacle, the plane of the section being indicated by the lines 2—2 on Fig. 1; Fig. 3 is a transverse section as indicated by the lines 3—3 on Fig. 2; and Fig. 4 is a diagram of the improved warning system including the flasher unit.

Figure 4:
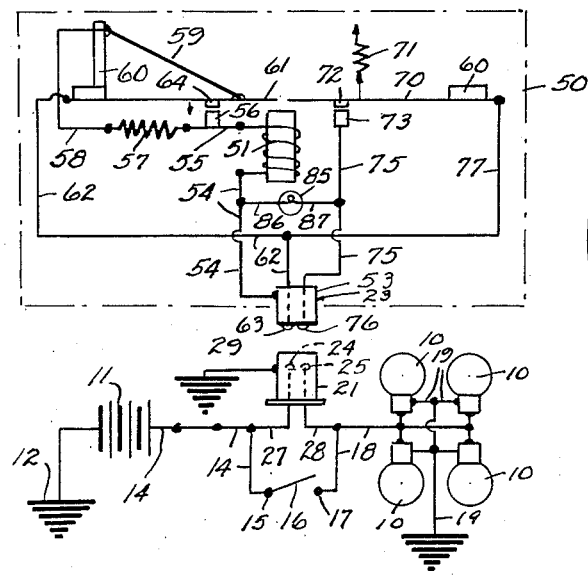

Referring now to the drawings and especially to Fig. 4, I have diagrammatically indicated a plurality of vehicle lamps 10 which are removably mounted in suitable sockets and which are protected by the usual transparent enclosures (not shown) but which provide warning lights. The lamps 10 are illuminated by the vehicle electrical system, which generally includes a storage battery 11, one terminal of which is grounded to the vehicle chassis as indicated at 12. The other terminal of the battery 11 is connected by conductors 14 with one terminal 15 of a manually operable switch 16. The other terminal 17 of this switch is connected by conductors 18 with one terminal of each of the signal lamps 10 to the other terminals which are grounded to the vehicle chassis by lines 19. Accordingly, the switch may be manually operated to open or close the electric circuit to the lamps 10 and thereby condition them for continuous duty as desired.

The lamps 10 are conditioned for flashing operation by opening the switch 16, and placing a flasher unit 20 in a receptacle 21. This receptacle preferably comprises a conventional lamp socket which is attached in a convenient position within the vehicle cab so as to be visible and accessible to the vehicle operator. The receptacle 21 is of the type having a metallic shell 22 adapted to receive a plug 23, carried by the flasher unit 20, hereinafter to be more fully described. The socket or receptacle 21 has a pair of electrical contacts 24 and 25 which are insulated from each other and from the shell 22 by insulating material 26. Conductors 27 and 28 connect the contacts 24 and 25 with respective conductors 14 and 18 which connect them to the battery 11 and lamps 10 respectively. The metallic shell 22 of the receptacle 21 is grounded to the vehicle frame by a conductor 29. The receptacle is provided with the usual bayonet slot (not shown) but which cooperates in the conventional manner with pins 30 of the flasher unit plug 21 to retain the same in position.

As illustrated in Fig. 1, the flasher unit 20 comprises a pair of substantially semi-spherical shells 31 and 32 having flanges 33 which are clamped together by a split channel shaped ring 34 to form a hollow housing. The ring 34 is secured in position by a screw 35. A diaphragm or mounting plate 36 is positioned between the flanges 33 and extends across the interior of the unit. A second housing 50 is mounted in an opening 37 of this plate and is held in position by tine-like formations 38 of the plate which engage the wall of the housing. An electrically operated flasher mechanism, hereinafter to be more fully described, is mounted within the housing 50.

The shell 31 is translucent and preferably colored red. The shell 32 may be translucent if desired and is provided with an opening 40 through which the plug 23, heretofore mentioned, extends. Suitable split rings 41 seating in grooves 42 formed in the exterior of the plug engage opposite walls of the shell 32 and retain the plug in position on the shell.

The mechanism of the flasher unit 20 is shown diagrammatically in Fig. 4. This mechanism may comprise an electromagnet 51 mounted on an insulation disc carried by the housing 50 and generally indicated at 52 in Fig. 2. One terminal of this magnet is connected by a conductor 54 with the metallic shell 53 of the plug 23. The other terminal of the magnet 51 is connected by a conductor 55 with a stationary switch contact 56.

This contact is in turn connected by a resistor 57 and a line 58 with one end of a thermally expansible wire or filament 59. This filament is fixed to a stationary insulator 60 and extends from such insulator to the free end of a spring leaf switch member 61 which carries a contact 64. The other end of this member is secured to the stationary insulator 60 and is connected by conductors 62 with a contact 63 of the plug 23.

The switch member 61 and the filament 59 are arranged so that, in their normal positions, the filament 59 tensions the switch member and maintains the contacts 56 and 64 separated. When an electric circuit is established through the filament, it heats and elongates whereupon the member 61, due to its resiliency, moves the contact 64 into engagement with the contact 56.

When the flasher unit is in position in the receptacle 21, a circuit is established from grounded terminal of the battery through magnet 51, the resistor 57, the filament 59, the switch leaf 61, to the ungrounded terminal of the battery. The establishment of this circuit causes the filament to heat and after a brief period of time this heating elongates the filament to such an extent that it no longer tensions the leaf spring 61, whereupon the latter closes the contacts 64 and 56, shunting the resistor 57 and the filament 59 from the circuit.

The removal of the resistor and filament from the circuit increases the energization of the magnet 51 to enable it to move a switch member 70 against the action of a spring 71 to establish a contact between a contact 72 carried by such switch member and a stationary contact 73. The contact 73 is connected by a conductor 75 with a terminal or contact 76 of the flasher unit plug 23, and the switch member 70 is connected by conductors 77 and 62 with the other terminal 63 of the plug 23 which in turn coacts with the receptacle contact 25, thus establishing a circuit to the lamps 10.

The lamps 10 remain illuminated for a brief interval of time, during which the filament 59 cools and contracting returns the leaf switch 61 to its normal position, opening the contacts 64 and 56. This breaks the shunt and again places the resistor 57 and filament 59 in the magnet circuit, thus decreasing the energization of the electromagnet 51 whereupon the spring 71 moves the leaf switch 70 to open the contacts 72 and 73 thereby breaking the lamp circuit. The opening of the contacts 64 and 56 again starts the heating of the filament 59 whereby the cycle of operation starts anew. The automatic repetition of this cycle of operation results in the repeating flashing of the lamps off and on.

The flasher unit 20 also provides a visible indicator as to the condition of the lamps 10. To this end the plate 36 of the flasher unit is provided with a second opening 80 to receive the metallic plug 81 of a small lamp 85. The terminals of the lamp 85 are connected by conductors 86 and 87 with the conductors 54 and 75. Accordingly, when the flasher unit is in position and the switch 16 is open the lamp 85 will flash on and off as will the lamps 10. Should the switch 16 be closed a continuous circuit will be established to the lamps 85 and 10. Thus the lamp 85 at all times indicates the condition of the circuit for the lamps 10. The lamp 85 may be of comparatively small size or power as, for instance, a glow lamp. When it is desired to turn the lights 10 off, the flasher unit 20 is removed from its receptacle 21 and the switch 16 is opened.

If desired, a second manually operable switch may be interposed in the conductor 14 between the battery and the switch 16 to open the circuit to both the switch 16 and the flasher unit 20.

I claim:

1. A flasher for lights of an automotive vehicle or the like comprising a translucent housing, an electric flasher mechanism mounted in said housing, a plug having externally positioned electrical contactors carried by said housing and adapted to seat in an automotive lamp receptacle and establish an electrical connection therewith, electric conductors between said flasher mechanism and said plug, and a lamp mounted in said housing and connected to said flasher mechanism.

2. A flasher for the lamps of an automotive vehicle comprising a housing, an electrically operated flasher mechanism in said housing, a support for said housing, a translucent housing enclosing said first named housing and carrying said support, a plug connector carried by said translucent housing and having a metallic shell, an electrical conductor connecting said shell with said flasher mechanism, a pair of electric contacts carried by said shell and insulated from each other and from the shell, and electric conductors connecting said contacts with said mechanism.

3. A flasher unit for automotive warning lights comprising a housing, an electrically operated flasher mechanism mounted in said housing, a pair of substantially semi-spherical shells, means to secure said shells together to form a hollow body, means carried by said body to secure said housing within said body and spaced from the walls thereof, at least one of said shells being translucent, an electrical connector plug carried by one of said shells, electrical conductors between said plug and said mechanism, and an indicator lamp mounted within said shells and exterior of said housing and connected with said mechanism to indicate the operating conditions thereof.

4. A flasher unit for automotive warning lights comprising, a pair of substantially semi-spherical shells each having a peripheral flange, a plate extending across one of said shells and substantially closing the same, means engaging said flanges to secure said shells together to form a hollow body, a housing mounted on said plate, an electrically operated flasher mechanism mounted in said housing, at least one of said shells being translucent, an electrical connector plug carried by the other of said shells, electrical conductors between said plug and said mechanism, and an indicator lamp mounted on said plate within said shells and exterior of said housing, and means connecting said lamp with said mechanism to indicate the operating conditions thereof.

ERVIN D. L. BOWMAN.

REFERENCES CITED

The following references are of record in the file of this patent:

UNITED STATES PATENTS

| Number | Name | Date |
| --- | --- | --- |
| 2,090,293 | Haines | Aug. 17, 1937 |
| 2,103,276 | Schmidinger | Dec. 28, 1937 |
| 2,165,562 | Mack et al. | July 11, 1939 |
| 2,171,349 | Wiley | Aug. 29, 1939 |
| 2,252,489 | Bluemle | Aug. 12, 1941 |
| 2,451,116 | Gross | Oct. 19, 1948 |